Aug. 25, 1942.  F. E. FREY ET AL  2,294,027
METHOD OF PRODUCING OLEFIN SULPHUR DIOXIDE RESINS
Filed Dec. 23, 1939
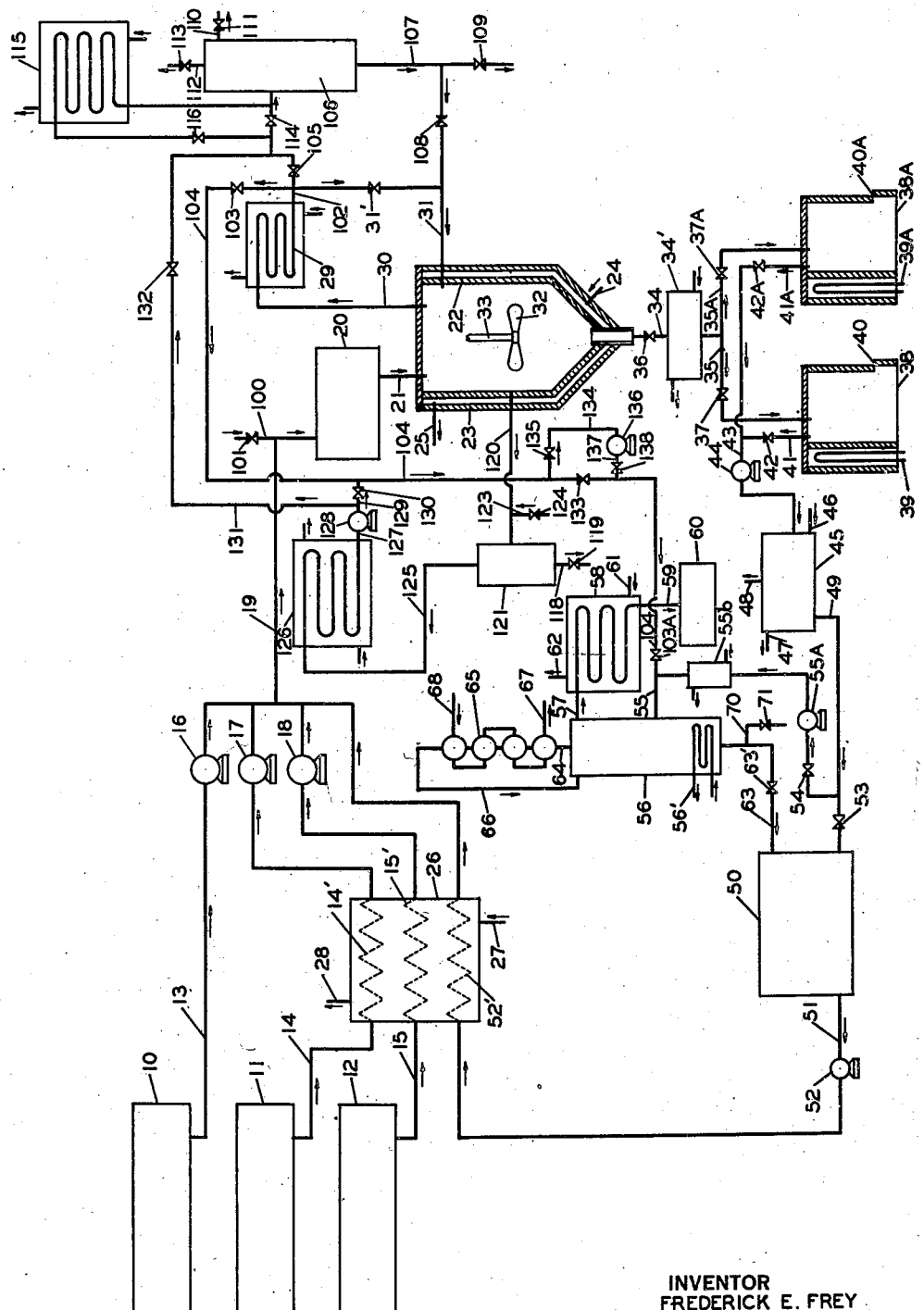
INVENTOR
FREDERICK E. FREY
ROBERT D. SNOW
BY
ATTORNEY Patented Aug. 25, 1942

2,294,027

UNITED STATES PATENT OFFICE 2,294,027

METHOD OF PRODUCING OLEFIN SULPHUR DIOXIDE RESINS

Frederick E. Frey and Robert D. Snow, Bartlesville, Okla., assignors to Phillips Petroleum Company, a corporation of Delaware Application December 23, 1939, Serial No. 310,700

12 Claims. (Cl. 260—94)

The present invention relates to the production of resins, and in particular to the production of high molecular weight heteropolymeric resinous materials from sulphur dioxide and an unsaturated organic material, such as an olefin hydrocarbon or a mixture of olefin hydrocarbons, or other olefinic compounds.

This invention is a continuation-in-part of our co-pending application, Serial No. 61,813, filed January 31, 1936, which is now U. S. Patent 2,184,295, and has among its objects the provision of an apparatus and method for continuously producing resins from unsaturated organic material and sulphur dioxide when the reactants are associated with substantial quantities of inert material such as paraffin hydrocarbons of substantially the same boiling range as that of the unsaturated material.

In the art prior to our co-pending application, Serial No. 61,813, of which the present application is a continuation-in-part, the references to the production of olefin-sulphur dioxide resins, or the like, describe the use of batch methods. The execution of such methods incurs the expensive construction and the high costs of operation for the numerous large reactors, specially designed to meet reaction conditions, inherent in discontinuous procedures of those methods. The application, Serial No. 61,813, discloses an apparatus and method for continuously producing resins from unsaturated organic compounds and sulphur dioxide.

The objects of the present invention are to provide a process of a substantially continuous nature for reacting sulphur dioxide with unsaturated material which is associated with substantial quantities of inert material, which will generally have substantially the same boiling range but which may be deliberately added material of a different boiling range; to provide a process wherein conditions are controlled in regard to concentration, temperature, etc., so as to promote the formation of resinous material and to permit it to separate as a second phase, and especially as a fluid or plastic phase that permits removal of this phase from the reactor in a substantially continuous manner or, if desirable, in substantial quantities at convenient intervals; and to provide means for the removal of the inert material from the reactor in sufficient quantities to prevent its accumulation to such an extent as to retard or stop the reaction while the reactants and catalysts are charged to the reactor in a substantially continuous manner. This invention provides means for deliberate addition, if desirable, of inert material such as paraffin hydrocarbons, in quantities sufficient to suppress the solubility of the resin in the reaction phase and to aid and promote the separation of the second phase.

Other objects and advantages of this invention will become evident on consideration of the description given herein.

In connection with the present process, the unsaturated material to be reacted with sulphur dioxide often is not in a substantially pure state. The material may be derived from the thermal or catalytic dehydrogenation of hydrocarbons, the products of cracking stills, or from other sources which produce material comprising large quantities of unsaturated compounds associated with paraffins of the same boiling range. The material thus obtained may be subjected to preliminary treatment, if desired, such as selective solvent extraction at low temperatures with liquid sulphur dioxide to concentrate the unsaturated material. In some cases, as when the charged unsaturated material contains large quantities of pentenes, hexenes and/or higher boiling olefins, it may prove advantageous to make deliberate addition of inert material in requisite quantities to decrease the solubility of the resin in the reaction phase and to facilitate the separation of the resin phase, and to add such material during the reaction and to control its concentration so as to effect and aid separation of the resinous product is a part of our invention. This may be especially true when unsaturated material other than unsaturated hydrocarbons are to be reacted with sulphur dioxide to form heteropolymeric resinous materials.

In practicing our present invention, means are provided for decreasing the concentration of inert material to within the limit of practicable operating conditions should such material tend to accumulate or attain too large proportions. If the ratio of inert material to the remaining quantity of charge stock is small, the rate of removal of this material with the resinous material, entrained or dissolved therein, will often equal, or exceed, the rate of addition with the charge stock, and there will not be accumulation of inert matter in the reactor; if, however, the rate of addition is slightly greater than the rate of removal, the whole of the second phase, or resin solution, may be removed from the reactor along with such quantities of the first liquid phase, or reaction phase, as are necessary to secure and maintain the desired concentration ratio.

If the charge stock contains large quantities of the inert material and the material is of such nature as to be gaseous, or readily vaporizable, under the conditions of the reaction, the concentration of this inert material in the reaction mixture may be decreased by removing quantities of the vapors from the reaction zone. These vapors thus removed will contain substantial quantities of the reactants, and it is desirable to separate these reactants from the inert material and to return these reactants to the reaction chamber as will be more fully discussed; this can be done by condensing vapors so removed and subsequently cooling the mixture to the point of liquid separation into two layers or, in the case of appreciable solubility of the inert material in the solution, fractional distillation of this mixture may be effected, or other suitable means of separation, to be more completely discussed, may be used.

If the inert material is present in large quantities and is of such nature as to remain liquid under the reaction conditions, and dissolved in the reaction phase, the concentration may be decreased by removing a liquid sidestream from the phase which comprises the reacting materials, subjecting such withdrawn materials to appropriate treatment for separation of the inert material and the reactants, such as fractional distillation, with return of the reactants. At intermediate conditions of concentration, and depending upon the nature of the inert material, it may be found desirable to supply heat, sufficient to vaporize quantities of the liquid phase but not sufficient to increase the temperature unduly, or to abstract heat, sufficient to condense portions of the vaporous phase but not decrease the temperature, to effect changes in state and produce, as a result, conditions for more practicable operation of means and methods providing decrease in concentration of the inert material, by removal of vapors or of liquid.

The apparatus and method for practicing this invention will become evident in the description of the apparatus and method of operation given in connection with the attached drawing, which illustrates diagrammatically one form of apparatus for practicing the present invention.

The reaction materials, catalyst, sulphur dioxide, and unsaturated organic material, which may be associated with substantial quantities of inert material of substantially the same boiling range, are stored respectively in any suitable vessels such as those shown at 10, 11 and 12. The desired quantities of these reaction materials are withdrawn through the pipes 13, 14 and 15, respectively by means of pumps 16, 17 and 18 into a common pipe 19, through which they pass to a mixer 20 of any convenient form. The mixer may be of a centrifugal, jet, orifice, baffle or any other type desired. An inert material may be added through pipe 100 controlled by valve 101, but should preferably have a small volume, so as to control the reaction in the reactor 22.

The mixture of the materials to be reacted flows, or is forced, from the mixer 20 through pipe 21 into the reactor zone, or reaction chamber 22, wherein the resin reaction of said mixture is effected.

During the reaction of the unsaturated material and the sulphur dioxide, incident to the formation of the resin in the chamber 22, there is a small amount of heat generated by exothermic reaction which is usually not desirable, and a temperature control in the chamber may be effected in several different ways. The reactor zone or reaction chamber may be provided with internal cooling coils, or a jacket 23, as shown, into which a cooling medium enters at 24, and from which it leaves at 25 after circulating therethrough. The jacket 23 may be operated as a heating means to maintain the desired temperature should excessive vaporization occur, and to abstract heat in quantities sufficient to decrease the temperature, when the heat of reaction is high.

Another means of controlling the temperature within the reaction zone 22 comprises removing sufficient sensible heat from the charge materials, namely catalyst, sulphur dioxide and unsaturated organic material which may be associated with inert material of substantially the same boiling range, by passing all or a part of them through a cooler 26 prior to mixing and introducing them into the reactor. The pipes 14 and 15 are shown passing through the cooler 26, serving as coils 14' and 15', and are cooled by a cooling medium which enters the cooler by pipe 27, flows through the cooler and leaves by way of pipe 28. This method of cooling has the advantage of retarding or preventing reaction during mixing and charging of the reaction materials. The cooler 26 may be by-passed by suitable means, not shown, as will be readily appreciated.

The reaction zone 22 may be cooled by any other suitable means or methods, which may include the provision of a cooler and condenser 29 into which the vapors within the chamber 22 flow through pipe 30 and are cooled and condensed before flowing back through pipe 31 controlled by valve 31', as reflux to cool the reactor.

It is frequently advantageous to agitate the charge undergoing reaction in chamber 22 and, for this purpose, an agitator 32 is shown mounted therein on a shaft 33 which may be supported and driven in any suitable manner.

As the resinous product forms in the bottom of the reactor, it is removed substantially continuously through pipes 34, 35 and 35a, controlled by valves 36, 37 and 37a respectively. The pipes 35 and 35a lead to expansion chambers 38 and 38a as shown. The resinous product may pass through a heater 34' before entering the expansion chamber. It is preferable to flow the resinous product into but one expansion chamber at a time, so by opening the valves 36 and 37 the product passes from the reaction chamber 22 through pipes 34 and 35 into the expansion chamber 38 where most of the volatile materials are removed by flash vaporization, and the resin is obtained in a very porous expanded form. The expansion chambers 38 and 38a are used alternately, one being filled with the resinous product from the reaction chamber 22 while vapors and resin are being discharged and removed from the other. As many expansion chambers of the type shown at 38 and 38a as are needed or desired may be used, in accordance with the capacity of the reaction chamber 22. To facilitate the flash vaporization of the material entering the expansion chambers or zones, heating means of any suitable type may be provided, and heating coils 39 and 39a are shown as one means of heating the chambers. Each chamber 38 and 38a is provided with a suitable means for removing the resin, and in the structure shown it takes the form of doors 40 and 40a.

Vapors are exhausted from the resin and the expansion chambers 38 and 38a through the pipes 41 and 41a, which are controlled by the valves 42 and 42a, and which connect through pipe 43 with the vacuum pump 44. The vapors so withdrawn from the expansion chambers are cooled in the condenser 45 through which a cooling medium flows, entering at 46 and leaving at 47. From the condenser fixed gases are vented through the pipe 48 and bled out of the system, and therein the sulphur dioxide and any organic material are liquefied. If the concentration of inert material is sufficiently low, so as not to retard the reaction in chamber 22, which would be true if the rate of removal of inert material entrained or dissolved in the resinous material is equal to or greater than the rate of addition, the condensate mixture is passed by pipe 49 to a storage tank or accumulator 50, and thence into pipe 51 through which it is forced by the pump 52 through the coil 52' of the cooler 26, for the purpose previously described, and then into pipe 19, mixer 20, and pipe 21 to the reaction chamber 22.

If the amount of inert material present in the condensate mixture from the condenser is such that its addition into reaction chamber 22 would increase the concentration of the inert material in the chamber beyond the limit of practicable operation, provisions must be made for the removal of quantities of the material. In order to accomplish this removal, a valve 53 is interposed in pipe 49 leading to the accumulator 50, and by closing it and opening the valve 54 in pipe 55 communicating with pipe 49 between the condenser 45 and valve 53, the condensate if fed to a fractionating column 56 from which an azeotropic mixture of hydrocarbon and sulphur dioxide is distilled overhead through the pipe 57 into the condenser 58, and through pipe 59 to the storage tank or accumulator 60. The fractionating column may be provided with any suitable heating means such as the steam coil shown at 56' and there may be interposed in pipe 55 any type of suitable pump 55a and a preheater 55b which is shown diagrammatically in the drawing. Through the condenser 58 there is circulated any suitable cooling medium which enters through pipe 61 and leaves through pipe 62. From the fractionating column 56 a liquid comprising sulphur dioxide and/or unsaturated material is drawn off at the bottom through pipe 63 as a kettle bottom product and introduced into the accumulator 50 from whence it flows through pipe 51 and ultimately reaches the reaction chamber 22.

The material leaving the top of the fractionating column is subjected to a reflux condensation and, to effect this, vapors are led off from the top of the column through pipe 64 and after passing through the reflux condenser illustrated diagrammatically at 65 they flow through pipe 66 into the top of the column 56. Any suitable means for cooling the reflux condenser may be employed, and in the drawing it is illustrated as being cooled by a cooling medium which enters through pipe 68 and leaves by way of pipe 67.

The concentration of inert material in the chamber may be maintained within the range of practicable operating conditions by decreasing the concentration of the material in the gaseous phase in the reaction chamber. Vapors may pass from the top of the reaction chamber 22 through pipe 30 into the cooler and condenser 29. If desired, the cooling medium in the condenser may be such that the vaporous material is condensed and sufficiently cooled to cause separation between liquid sulphur dioxide and liquid inert material; the cooling in condenser 29 may, however, be effected by the use of ordinary plant cooling water as the medium, in which case the cooled material is withdrawn through pipe 102 controlled by valves 105 and 116 into a second cooler and condenser 115, which is supplied with a suitable cooling or refrigerating medium which extracts heat sufficiently to cause further cooling and condensation, and separation of the liquid into two liquid layers. The material is withdrawn from condenser 29 through pipe 102 and valve 105 into separator 106 or, as partially cooled material, into cooler 115 and thence into the separator 106 as shown with proper control of valve 114. From the separator, the lighter layer, rich in inert material is removed from the system by pipe 110 controlled by valve 111, and the bottom liquid layer, rich in sulphur dioxide and unsaturated material, is passed to pipe 31 and returned to the reaction chamber 22 through pipe 107 by means of valve 108, or it may be withdrawn from the system by means of valve 109. Vapors may be withdrawn through pipe 112 controlled by valve 113.

An alternative method of treating the vapors will be found advantageous if a large concentration of an inert material such as butane or pentanes is present, since such material would be carried over at an appreciable rate with the sulphur dioxide fraction from separator 106 and, in the presence of unsaturated material, is difficult to separate from liquid sulphur dioxide. The cooled material from the cooler and condenser 29, which need not be operated at a low subatmospheric temperature in this instance, is passed through valve 103 in pipe 104 and transferred to the fractionating column 56 through valve 103a where the azeotropic mixture of hydrocarbon and sulphur dioxide is separated and passed into accumulator 60, and a fraction comprising unsaturated material and sulphur dioxide drawn off through pipe 63 into accumulator 50 as previously described.

We have found that still another method of maintaining the concentration of inert material within the limits of practicable operating conditions may be effective. This involves treatment of the liquid phase which comprises the reacting materials. When necessary, such quantities of the material are withdrawn, as a liquid side stream through pipe 120, as are required to decrease the concentration to the desired ratio, and the material is immediately treated with a substance to kill the catalyst or otherwise to inhibit the resin-forming reaction, this catalyst-inhibitor being introduced through pipe 123 and valve 124, to prevent further resin-formation and the subsequent gumming-up or clogging of the apparatus. The mixture is passed into chamber 121 and subjected to flash vaporization whereby the volatile materials are removed and any resinous product that is present remains and may be removed, as previously described in connection with the resin expansion chambers 38 and 38a, through pipe 118 and valve 119. The vapors pass from chamber 121 through pipe 125 and cooler 126 into pipe 127, and through pump 128 and pipe 129 controlled by a valve 130 into pipe 104, and into the fractionating column 56. When this means of removing inert material from the reaction 22 is employed, a suitable separation may often be effected by condensing and cooling the material so that two liquid phases are formed. In such a case the mixture may be passed from pipe 129 through pipe 131 and valve 132 to pipe 102, and finally to liquid separator 106.

The pressure of the material passing through pipe 104, whether it comes from the cooler 29 or the cooler 126, may be boosted to a suitable operating pressure for the fractionator 56 by means of pump 136, which has a charge line 134 controlled by a valve 135 leading from pipe 104, and a discharge line 137 controlled by valve 138 leading back to pipe 104, and this may be operated with the closing of valve 133 in pipe 104.

When the inert material is considerably higher boiling than sulphur dioxide, and fractional distillation in the column 56 is used for the separation, the inert material will pass from the bottom of the column 56 through pipe 63. In such a case, it will be substantially freed of sulphur dioxide, and can be discharged from the system through pipe 70 controlled by a valve 71, the valve 63' in pipe 63 being closed. With this modification, substantially all the sulphur dioxide will pass overhead through pipe 57 without being accompanied by inert material, and will be received in the accumulator 60 in a state suitable for recycling. This may readily be carried out by obvious means, not shown. Generally, however, in such a case it will be desirable to separate the sulphur dioxide and inert material as two separate liquid phases, in apparatus such as separator 106, as discussed. In this procedure a large part of the unreacted, unsaturated material is found in the liquid sulphur dioxide phase, and as such is readily returned to the reaction. In most cases the liquid sulphur dioxide will have a higher specific gravity than will any liquid inert material, and the separation will be as has been indicated. However, if this relationship is reversed, it will be readily appreciated that the various connections to separator 106 may be changed to meet the circumstances.

It will now be seen that inert material may be removed from the reactor 22 when it has a high vapor pressure at the reaction temperature and also when it has a low vapor pressure, and when it is readily separated from liquid sulphur dioxide as an immiscible liquid as well as when distillation must be used for the separation.

The reaction of unsaturated material with sulphur dioxide to form heteropolymeric resinous materials of high molecular weight is well known, and may take place in the dark when promoted by light, and/or in the presence of catalysts. In this regard, reference is made to U. S. Patents 2,045,592; 2,112,986; 2,128,932; 2,136,028 and 2,136,389 among others. When lower boiling unsaturated materials are used, especially the lower boiling unsaturated hydrocarbons, they are often accompanied by inert saturated hydrocarbons of the same boiling range, even though a concentration step for such unsaturated hydrocarbons has been used. Since the reaction is selective to the unsaturated hydrocarbons present, it in itself tends to concentrate the inert, saturated hydrocarbons, and thus at times means such as has been described herein are necessary. In other cases where the unsaturated materials are introduced to the process in a substantially pure state, especially with unsaturated materials having more than about six carbon atoms per molecule, the resinous products are quite soluble in the reactant mixture, and it is desirable to alter this condition by adding an inert material to facilitate separation of the resin as it is produced. Since the reaction temperatures generally are not very high, it is often most expedient to add an inert material having a much lower boiling point than the unsaturated material, such as butane, pentane or hexane, and to do so is a part of our invention. A fixed quantity of such an inert material may be retained in the reactor, without drawing any out and without adding any, but when such inert material is added continuously, of low or high boiling point, it is conveniently removed as herein described.

We claim:

1. In a process in which an olefinic body reacts with approximately an equimolar quantity of sulphur dioxide to form a high molecular weight heteropolymeric resinous product which separates from the reactants as a separate viscous liquid phase usually containing some excess sulphur dioxide, the said olefinic body being associated with substantial quantities of inert material of substantially the same boiling range in which said resinous product is substantially insoluble, the steps which comprise charging to the reaction zone as reactants sulphur dioxide and a mixture containing said olefinic body and said inert material, substantially continuously and in such proportion, in the presence of a catalyst for promoting the reaction, that a mass comprising said heteropolymeric resinous product separates from the reactants in said reaction zone as a separate viscous liquid phase, withdrawing a portion of the gaseous phase present in said zone, separating from said withdrawn material a fraction comprising said inert material and discharging it from the process, separating also a fraction comprising sulphur dioxide and returning said fraction to said reaction zone, and separating from said reaction zone a viscous liquid containing said heteropolymeric resinous product.

2. In a process in which an olefinic material reacts with approximately an equimolar quantity of sulphur dioxide to form a high molecular weight heteropolymeric resinous product which separates from the reactant mixture as a separate viscous liquid phase containing some excess sulphur dioxide, the said olefinic material being associated with substantial quantities of relatively volatile inert organic material of substantially the same boiling range in which said resinous product is substantially insoluble, the steps which comprise substantially continuously charging to a reaction zone sulphur dioxide and said olefinic material associated with said inert material, in the presence of a catalyst for promoting the reaction, maintaining a reaction temperature such that said reactants and inert material are present together in a first liquid phase, charging said materials in such proportions that a solution comprising high molecular weight heteropolymeric resinous material separates from said reactants as a second and viscous liquid phase, withdrawing a portion of the gaseous phase present in said zone, separating from the withdrawn material a fraction comprising said volatile inert material and discharging said fraction from the process, separating also from said material a fraction comprising sulphur dioxide and returning said fraction to said reaction zone, and substantially continuously withdrawing a material comprising said second liquid phase from said reaction zone.

3. In a process for the production of a high molecular weight resinous product from sulphur dioxide and a relatively volatile olefinic material which reacts with sulphur dioxide to form such a product and which is associated with relatively volatile inert saturated organic material of substantially the same boiling range in which said resinous product is substantially insoluble, the steps which comprise feeding to a reaction zone, in the presence of a catalyst for promoting the reaction, sulphur dioxide in a liquid state and said olefinic material associated with said inert material substantially continuously and in such proportions that a viscous solution of resinous product will separate from the reactants, withdrawing a portion of the material forming a gaseous phase in said reaction zone, liquefying said material and subjecting it to a fractional distillation to separate overhead a vapor fraction comprising said inert material along with sulphur dioxide and discharging said fraction from the system, separating as a kettle product a fraction comprising said olefinic material and returning said fraction to said reaction zone, and substantially continuously withdrawing said viscous solution of resinous product from said reaction zone.

4. In a process for the production of a high molecular weight heteropolymeric resin from sulphur dioxide and a relatively volatile olefinic material which reacts with sulphur dioxide to form such a resin and which is associated with relatively volatile inert saturated organic material of substantially the same boiling range in which said resin is relatively insoluble, the steps which comprise charging to a reaction chamber in a liquid state sulphur dioxide and said olefinic material associated with said inert material substantially continuously and in such proportions, in the presence of a catalyst for promoting the reaction, that a viscous solution of the resin will separate from the reactants, withdrawing a portion of the material forming a gaseous phase in said reaction chamber, liquefying said material and cooling it to a low temperature to cause said material to separate into two liquid phases consisting of an upper liquid phase comprising said inert material and a lower liquid phase comprising sulphur dioxide and volatile olefinic material, discharging said upper liquid phase from the process, passing said lower liquid phase to said reaction chamber, and substantially continuously withdrawing said solution of resin from said reaction chamber.

5. In a process for the production of a high molecular weight heteropolymeric resinous product from sulphur dioxide and an olefinic material which reacts with sulphur dioxide to form such a product, the steps which comprise substantially continuously charging to a reaction chamber sulphur dioxide and said olefinic material in such proportions, in the presence of a catalyst for promoting the reaction, that the resin-forming reaction takes place, introducing such quantities of volatile inert material in which said resinous product is relatively insoluble into the reaction zone as will suppress the solubility of the resin in the reaction phase and facilitate the separation of a separate viscous liquid phase comprising the resinous product, withdrawing a portion of the gaseous phase present in said zone, separating from the withdrawn material a fraction comprising said inert material and discharging said fraction from the process, separating also from said material a fraction comprising sulphur dioxide and returning said fraction to said reaction zone, and substantially continuously withdrawing from the zone a viscous liquid containing said heteropolymeric resinous product.

6. In a process for the production of a high molecular weight heteropolymeric resinous product from sulphur dioxide and an olefinic material which reacts with sulphur dioxide to form such a product, the steps which comprise substantially continuously charging to a reaction chamber sulphur dioxide and said olefinic material in such proportions, together with a catalyst for promoting the reaction, that the resin-forming reaction takes place, adding such quantities of inert material in which said resinous product is relatively insoluble to the reaction chamber as will suppress the solubility of the resin in the liquid reaction phase and facilitate the separation of a separate viscous liquid phase comprising the resinous product, withdrawing a portion of the liquid reaction phase present in said chamber, separating from the withdrawn material a fraction comprising said inert material and discharging said fraction from the process, separating also from said material a fraction comprising sulphur dioxide and returning said fraction to said reaction chamber, and substantially continuously withdrawing from the chamber a viscous liquid containing said heteropolymeric resinous product.

7. In a process for the production of a high molecular weight heteropolymeric resin from sulphur dioxide and an olefinic material which reacts with sulphur dioxide to form such a resin and which is associated with inert material of substantially the same boiling range in which said resin is relatively insoluble, the steps which comprise charging to a reaction chamber in a liquid state sulphur dioxide and said olefinic material associated with said inert material substantially continuously and in such proportions, together with a catalyst for promoting the reaction, that a viscous solution of the resin will separate from the reactants, withdrawing a fraction as a liquid side stream from the phase comprising the reacting materials, introducing a catalyst-inhibitor to said withdrawn fraction and subjecting the mixture to flash vaporization, withdrawing the vaporous products from said vaporization and separating said products by fractional distillation into a vapor fraction comprising said inert material along with sulphur dioxide, discharging said fraction from the system, separating also as a kettle product a fraction comprising olefinic material and sulphur dioxide, returning said fraction to said reaction zone, and substantially continuously withdrawing as a separate liquid a portion of said viscous solution containing said heteropolymeric resinous product from said reaction chamber.

8. In a process for the production of a heteropolymeric resinous product of high molecular weight from sulphur dioxide and an olefinic organic material which reacts with sulphur dioxide to form such a resinous material, the steps which comprise substantially continuously charging the said olefinic material and sulphur dioxide, said sulphur dioxide being present in excess of that amount required as a reactant, to a reaction chamber under sufficient pressure to maintain at least a major portion of said reactants in a liquid phase in said reaction chamber, promoting a reaction between said olefinic material and said sulphur dioxide to form a heteropolymeric resinous material, maintaining in said reaction chamber butane in a concentration sufficient to aid the separation of said heteropolymeric resinous material as a separate viscous liquid phase containing sulphur dioxide and in a concentration insufficient to inhibit said reaction excessively, and withdrawing from said reaction chamber said heteropolymeric resinous material.

9. In a process for the production of a heteropolymeric resinous product of high molecular weight from sulphur dioxide and an olefinic organic material which reacts with sulphur dioxide to form such a resinous material, the steps which comprise substantially continuously charging the said olefinic material and sulphur dioxide, said sulphur dioxide being present in excess of that amount required as a reactant, to a reaction chamber under sufficient pressure to maintain at least a major portion of said reactants in a liquid phase in said reaction chamber, promoting a reaction between said olefinic material and said sulphur dioxide to form a heteropolymeric resinous material, maintaining in said reaction chamber pentane in a concentration sufficient to aid the separation of said heteropolymeric resinous material as a separate viscous liquid phase containing sulphur dioxide and in a concentration insufficient to inhibit said reaction excessively, and withdrawing from said reaction chamber said heteropolymeric resinous material.

10. In a process for the production of a heteropolymeric resinous product of high molecular weight from sulphur dioxide and an olefinic organic material which reacts with sulphur dioxide to form such a resinous material, the steps which comprise substantially continuously charging the said olefinic material and sulphur dioxide, said sulphur dioxide being present in excess of that amount required as a reactant, to a reaction chamber under sufficient pressure to maintain at least a major portion of said reactants in a liquid phase in said reaction chamber, promoting a reaction between said olefinic material and said sulphur dioxide to form a heteropolymeric resinous material, maintaining in said reaction chamber hexane in a concentration sufficient to aid the separation of said heteropolymeric resinous material as a separate viscous liquid phase containing sulphur dioxide and in a concentration insufficient to inhibit said reaction excessively, and withdrawing from said reaction chamber said heteropolymeric resinous material.

11. In a process in which an olefinic material reacts with approximately an equimolar quantity of sulphur dioxide to form a heteropolymeric resinous product soluble in liquid sulphur dioxide, the improvement which comprises substantially continuously feeding to a reaction chamber as liquids said olefinic material, sulphur dioxide in an amount in excess of that molecularly equivalent to said unsaturated material, and sufficient inert saturated hydrocarbon material in which the resinous product is substantially insoluble to suppress the solubility of the resin in the liquid reaction phase and facilitate the separation of a separate viscous liquid phase comprising sulphur dioxide and the resinous product, promoting a reaction in said reaction chamber between said unsaturated material and said sulphur dioxide to form a heteropolymeric resinous product, removing from said reaction chamber a mixture comprising inert material and unreacted sulphur dioxide and substantially free of said resinous product, separating sulphur dioxide from said inert material and returning said sulphur dioxide to said reaction chamber, separately withdrawing a portion of said viscous liquid phase from said reaction chamber containing sulphur dioxide and said heteropolymeric resinous product, and recovering therefrom a heteropolymeric resinous product so produced.

12. A continuous process for the production of heteropolymeric resinous products of the reaction of sulphur dioxide with an unsaturated organic material comprising normal butenes associated with normal butane, which comprises substantially continuously charging to a reaction chamber as liquids such an unsaturated material and sulphur dioxide in an amount in excess of that molecularly equivalent to said unsaturated material, promoting a reaction between said unsaturated material and sulphur dioxide to form a heteropolymeric resinous product which separates from the reaction mixture as a viscous liquid, withdrawing a portion of the gaseous phase present in said reaction chamber, subjecting said material to a fractional distillation to separate as an overhead product a minimum-boiling mixture of sulphur dioxide and butane and as a kettle product a fraction comprising unsaturated organic material, returning said unsaturated material to said reaction chamber, substantially continuously withdrawing said viscous liquid from said chamber and recovering therefrom a resinous product so produced.

FREDERICK E. FREY.
ROBERT D. SNOW.